United States Patent
Kaneko et al.

(10) Patent No.: US 6,173,571 B1
(45) Date of Patent: Jan. 16, 2001

(54) EXHAUST PURIFYING APPARATUS FOR AN IN-CYLINDER INJECTION TYPE INTERNAL COMBUSTION ENGINE

(75) Inventors: Katsunori Kaneko; Kazuo Koga; Hiromitsu Ando; Taizo Kitada, all of Tokyo (JP)

(73) Assignee: Mitsubishi Jidosha Kogyo Kabushiki Kaisha, Tokyo (JP)

(*) Notice: Under 35 U.S.C. 154(b), the term of this patent shall be extended for 0 days.

(21) Appl. No.: 09/180,448

(22) PCT Filed: Feb. 10, 1998

(86) PCT No.: PCT/JP98/00546

§ 371 Date: Nov. 9, 1998

§ 102(e) Date: Nov. 9, 1998

(87) PCT Pub. No.: WO98/44245

PCT Pub. Date: Oct. 8, 1998

(30) Foreign Application Priority Data

Mar. 31, 1997 (JP) .................................................. 9-098093

(51) Int. Cl.$^7$ ........................................................ F01N 3/00
(52) U.S. Cl. ................................ 60/286; 60/285; 60/297; 123/430; 123/300
(58) Field of Search .......................... 60/286, 285, 295, 60/297, 303; 123/430, 431, 295, 300

(56) References Cited

U.S. PATENT DOCUMENTS

| | | | | |
|---|---|---|---|---|
| 5,207,058 | * | 5/1993 | Sasaki et al. | 60/284 |
| 5,472,673 | * | 12/1995 | Goto et al. | 422/169 |
| 5,479,775 | * | 1/1996 | Kraemer et al. | 60/274 |
| 5,483,795 | * | 1/1996 | Katoh et al. | 60/276 |
| 5,642,705 | * | 7/1997 | Morikawa et al. | 123/300 |
| 5,778,666 | * | 7/1998 | Cullen et al. | 60/274 |
| 5,839,275 | * | 11/1998 | Hirota et al. | 60/285 |
| 5,910,096 | * | 6/1999 | Hepburn et al. | 60/274 |

FOREIGN PATENT DOCUMENTS

| | | |
|---|---|---|
| 0580389A1 | 1/1994 | (EP) . |
| 2-294334 | 4/1996 | (GB) . |
| 63-150441 | 6/1988 | (JP) . |
| 4183922 | 6/1992 | (JP) . |
| 6-66129 | 3/1994 | (JP) . |
| 6-88518 | 3/1994 | (JP) . |
| 666129 | 3/1994 | (JP) . |
| 7186785 | 7/1995 | (JP) . |
| 7-332071 | 12/1995 | (JP) . |
| 8061052 | 3/1996 | (JP) . |
| 8-100638 | 4/1996 | (JP) . |
| 8105318 | 4/1996 | (JP) . |
| 8200045 | 8/1996 | (JP) . |
| 8218918 | 8/1996 | (JP) . |
| 8296485 | 11/1996 | (JP) . |
| 8303290 | 11/1996 | (JP) . |
| 8312408 | 11/1996 | (JP) . |
| 9-32619 | 2/1997 | (JP) . |
| 9622457A1 | 7/1996 | (WO) . |

* cited by examiner

Primary Examiner—Thomas Denion
Assistant Examiner—Binh Tran

(57) ABSTRACT

An exhaust purifying apparatus for an in-cylinder injection type internal combustion engine causes exhaust gas temperature to rise reliably, thereby desorbing reliably a sulfur component ($SO_x$) adhered to an $NO_x$ catalyst and enhancing the durability of the $NO_x$ catalyst. For this reason, the exhaust purifying apparatus for an in-cylinder injection type internal combustion engine comprises an $NO_x$ catalyst (9A) for adhering $NO_x$ to itself in an excess oxygen concentration condition and desorbing $NO_x$ in an oxygen concentration reduction condition, and sulfur component desorption means (107) for desorbing a sulfur component from the $NO_x$ catalyst (9A). The sulfur component desorption means (107) injects additional fuel during an expansion stroke in addition to main injection and burns the additional fuel again so that exhaust gas temperature is raised to a predetermined temperature or beyond, whereby the sulfur component is desorbed.

14 Claims, 7 Drawing Sheets

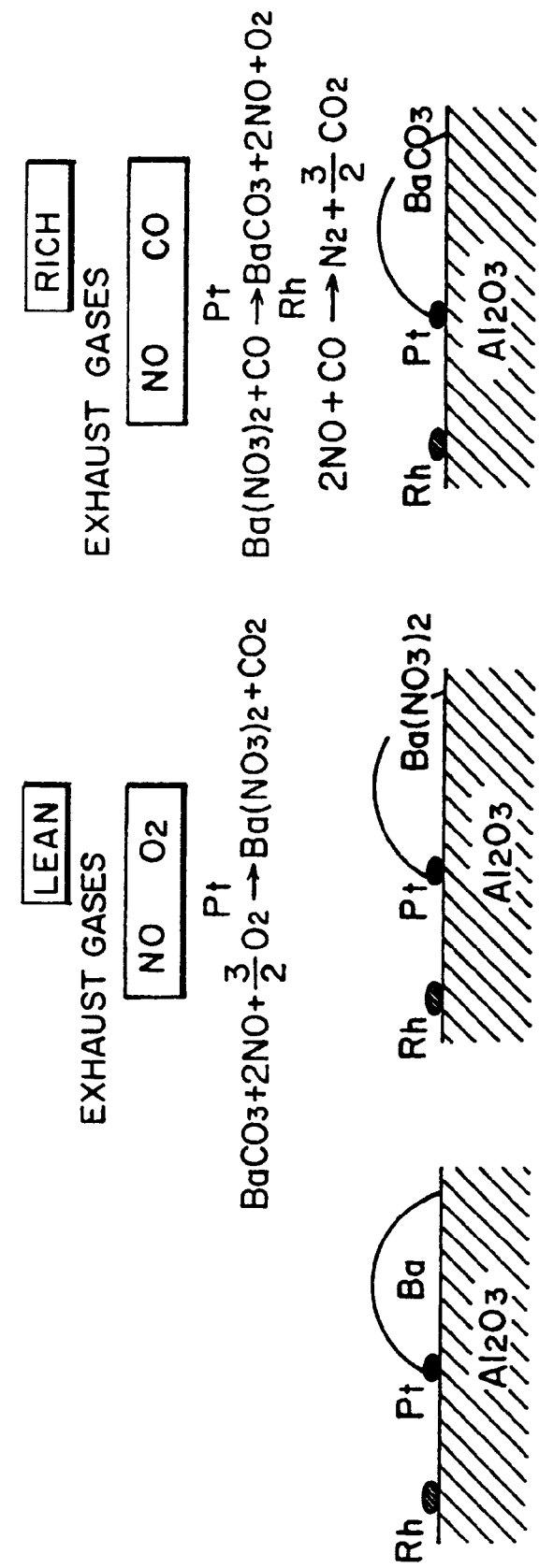

FIG. 5(a)
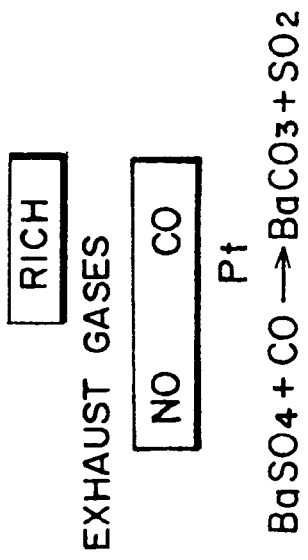
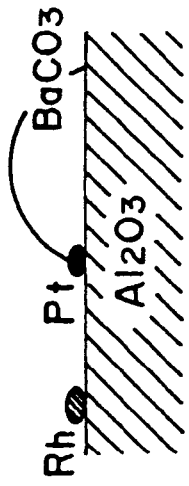
EXHAUST GASES
$SO_2$  $NO_x$  $O_2$
LEAN
$2SO_2 + O_2 \rightarrow 2SO_3$
$BaCO_3 + SO_3 \rightarrow BaSO_4 + CO_2$
FIG. 5(b)
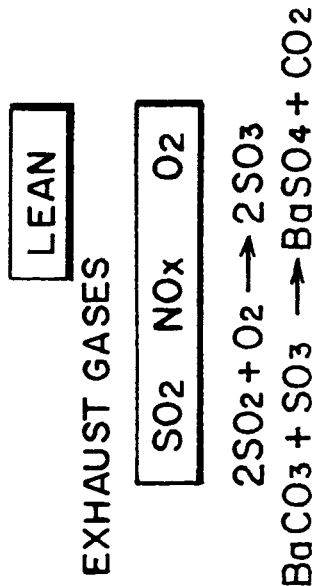
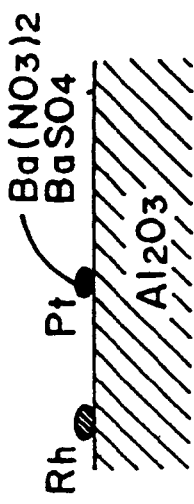
EXHAUST GASES
$NO$  $CO$
RICH
$BaSO_4 + CO \rightarrow BaCO_3 + SO_2$

EQUILIBRIUM FORMULA:

$CO + 1/2 O_2 \leftrightarrow CO_2$ $H_2 + 1/2 O_2 \leftrightarrow H_2O$ $BaCO_3 + SO_2 + 1/2 O_2 \leftrightarrow BaSO_4 + CO_2$

EXHAUST PURIFYING APPARATUS FOR AN IN-CYLINDER INJECTION TYPE INTERNAL COMBUSTION ENGINE

This application is the national phase under 35 U.S.C. §371 of prior PCT International Application No. PCT/JP98/00546 which has an International filing date of Feb. 10, 1998 which designated the United States of America, the entire contents of which are hereby incorporated by reference.

TECHNICAL FIELD

The present invention relates to an exhaust purifying apparatus which performs exhaust purification in an in-cylinder injection type internal combustion engine that injects fuel directly into its combustion chamber, and particularly relates to an exhaust purifying apparatus for in an in-cylinder injection type internal combustion engine, suitable for use in the desorption of a sulfur component ($SO_x$) by fuel injection control.

BACKGROUND ART

Presently, in-cylinder injection type internal combustion engines, which inject fuel directly into the combustion chamber, have been put to practical use. In such in-cylinder injection type internal combustion engines, since timing to inject fuel can be set freely, fuel injection is performed on a compression stroke in a low load operating area, a mixture with fuel concentration sufficient for ignition is collected locally near a spark plug, and super lean combustion by so-called stratified-charge combustion is performed, whereby an even further enhancement in fuel consumption is contrived.

In an in-cylinder injection type internal combustion engine as described above, the operation in this super lean region is performed in a predetermined operating region/so it is difficult from the side of exhaust purification to make the exhaust gas characteristics satisfactory by providing only a three-way catalyst (having a three-way function near a stoichiometric ratio) which is used in a multipoint injection (MPI) engine, etc.

Hence, a lean $NO_x$ catalyst that can purify $NO_x$ even in an excess oxygen concentration condition, in which oxygen in exhaust gases becomes excessive, has been developed, and providing this $NO_x$ catalyst is indispensable.

For this lean $NO_x$ catalyst, types which purify $NO_x$ in exhaust gases by adhering $NO_x$ to a catalyst (an occlusion type lean $NO_x$ catalyst and a trap type lean $NO_x$ catalyst) have been developed.

This lean $NO_x$ catalyst has the function of adhering $NO_x$ in exhaust gases to itself in an excess oxygen concentration condition and desorbing the adhered $NO_x$ if oxygen concentration is reduced. In other words, in an oxygen excess concentration condition, the lean $NO_x$ catalyst has a function of oxidizing NO in exhaust gases and generating a nitride, thereby adhering $NO_x$ to itself. On the other hand, in a condition in which oxygen concentration has been reduced, the lean $NO_x$ catalyst has the function of causing the nitride adhered to itself and CO in exhaust gases to react and generating a carbonate, thereby desorbing $NO_x$.

Incidentally, fuel or lubricating oil contains a sulfur component (S component), and such a sulfur component is also contained in exhaust gases. In the lean $NO_x$ catalyst, in an excess oxygen concentration condition, $NO_x$ adheres and also the sulfur component adheres. In other words, the sulfur component burns, and furthermore, it is oxidized on the lean $NO_x$ catalyst into $SO_3$. And part of this $SO_3$ further reacts with an $NO_x$ occluding agent on the lean $NO_x$ catalyst and becomes a sulfate, so that it adheres to the lean $NO_x$ catalyst.

Therefore, a nitride and a sulfate adhere to the lean $NO_x$ catalyst, but, since the sulfate is higher in stability as a salt than the nitride and only a portion thereof is resolved even in a condition in which oxygen concentration has been reduced, the quantity of the sulfate remaining on the lean $NO_x$ catalyst increases with time. With this, as the $NO_x$ adhesion ability of the lean $NO_x$ catalyst is reduced with time, the catalytic performance of the lean $NO_x$ catalyst is degraded (this is referred to as S poisoning).

The nitride which reduces the $NO_x$ adhesion ability of such a lean $NO_x$ catalyst has the resolve property if temperature becomes high.

For this reason, for example, in a technique disclosed in Japanese Laid-Open Patent Publication No. SHO 63-150441, the opening angle of an idle speed control valve is increased to increase an intake air quantity and the engine revolution speed is raised to a high revolution region (2000 to 3000 rpm) and maintained, whereby an attempt is made to hold the catalyst bed temperature at high temperatures. And in this state, the quantity of fuel is increased to make an air-fuel ratio rich, whereby an attempt is made to cause exhaust gases passing on a catalyst to be in a condition of deoxidization.

However, since a special operating state such as this will have influence on the output torque of an engine, it cannot be applied to any engine. For example, in the case where such a technique is applied to engines for automobiles, if the above-mentioned special operating state is produced during the normal operation of an automobile, it will have influence on the travel of the automobile and be difficult to put to practical use.

In addition, for example, in a technique disclosed in Japanese Laid-Open Patent Publication No. HEI 6-66129, when a certain quantity or greater of sulfur component adheres to a lean $NO_x$ catalyst, the air-fuel ratio of exhaust gases is made a stoichiometric air-fuel ratio or made rich, and the exhaust gases are heated and raised in temperature by an electric heater arranged around an exhaust pipe, whereby an attempt is made to resolve and desorb the sulfur component from the lean $NO_x$ catalyst.

However, in this technique, there is a need to arrange an electric heater to raise the temperature of exhaust gases, so that the cost is considerably increased. On the other hand, in the electric heater, warm-up time is required and it takes time to raise the temperature of exhaust gases, so that it is difficult to regenerate the purification efficiency of the catalyst early. In addition, it is undesirable to make an air-fuel ratio a stoichiometric air-fuel ratio or make it rich, because if done, fluctuation will occur in the engine output torque.

The present invention has been made in view of such problems, and it is an object of the invention to provide an exhaust purifying apparatus for an in-cylinder injection type internal combustion engine which is capable of reliably desorbing a sulfur component adhered to an $NO_x$ catalyst and enhancing the durability of the $NO_x$ catalyst, by reliably raising exhaust gas temperature, while providing no additional device and furthermore having no influence on an engine output torque.

SUMMARY OF THE INVENTION

In an exhaust purifying apparatus equipped in an in-cylinder injection type internal combustion engine which is equipped with a fuel injection valve for injecting fuel directly into a combustion chamber and in which fuel is injected during at least a compression stroke by the fuel injection valve to perform stratified-charge combustion, the exhaust purifying apparatus for the in-cylinder injection type internal combustion engine of the present invention comprises: an $NO_x$ catalyst provided in an exhaust passage of the internal combustion engine, the $NO_x$ catalyst adhering $NO_x$ to itself in an excess oxygen concentration condition and desorbing $NO_x$ in a reduced oxygen concentration condition; and sulfur component desorption means for desorbing a sulfur component from the $NO_x$ catalyst. The sulfur component desorption means injects additional fuel during an expansion stroke in addition to main injection for the stratified-charge combustion and also burns the additional fuel again such that exhaust gas temperature is raised to a predetermined temperature or beyond, whereby the sulfur component is desorbed.

With constitution such as this, without providing an additional device, additional fuel can be made to reliably burn and exhaust gas temperature can be made to rise, so the sulfur component adhered to an $NO_x$ catalyst can be reliably resorbed. With this, there is an advantage that the durability of the $NO_x$ catalyst can be enhanced.

Also, since exhaust gas temperature can be made to rise in a short period of time, there is also an advantage that the desorption of the sulfur component from the lean $NO_x$ catalyst by the sulfur component desorption means can be performed in a short period of time. Furthermore, there is also an advantage that additional fuel can be made to burn and exhaust gas temperature can be made to rise reliably, without having influence on the output torque of an internal combustion engine.

Preferably, the injection time of the additional fuel injection on an expansion stroke is set so that exhaust gas temperature reaches approximately 600° or greater. Also, it is preferable that the air-fuel ratio of main combustion (air-fuel ratio within a cylinder) be equal to or greater than approximately 20 during operation of the sulfur component desorption means. In addition, it is preferable that a control of desorbing a sulfur component by the sulfur component desorption means continue for a predetermined period of time (the order of about 5 min).

Also, the exhaust purifying apparatus according to the present invention preferably has a sulfur component adhesion quantity estimation means for estimating an adhesion quantity of a sulfur component which adheres to the $NO_x$ catalyst and reduces an $NO_x$ adhesion ability of the $NO_x$ catalyst. It is preferable that the sulfur component desorption means be operated according to an output from the sulfur component adhesion quantity estimation means.

With constitution such as this, by estimating the adhesion quantity of a sulfur component to an $NO_x$ catalyst, there is an advantage that the sulfur component desorption means can be made to operate at proper timing.

Furthermore, it is preferable that the sulfur component adhesion quantity estimation means estimate an adhesion quantity of the sulfur component, based on a total fuel injection quantity which is obtained from an integrated value of injector drive periods of all operating modes.

With constitution such as thus, there is an advantage that the estimation of the adhesion quantity of a sulfur component to an $NO_x$ catalyst can be performed easily and simply.

BRIEF DESCRIPTION OF THE DRAWINGS

FIG. 4(a) is a schematic view for describing a lean $NO_x$ catalyst in the exhaust purifying apparatus for an in-cylinder injection type internal combustion engine according to one embodiment of the present invention and is a diagram showing the constitution of the lean $NO_x$ catalyst;

FIG. 4(b) is a schematic view for describing a lean $NO_x$ catalyst in the exhaust purifying apparatus for an in-cylinder injection type internal combustion engine according to one embodiment of the present invention and is a diagram showing the $NO_x$ adhesion function of the lean $NO_x$ catalyst;

FIG. 4(c) is a schematic view for describing a lean $NO_x$ catalyst in the exhaust purifying apparatus for an in-cylinder injection type internal combustion engine according to one embodiment of the present invention and is a diagram showing the $NO_x$ desorption function of the lean $NO_x$ catalyst;

FIG. 5(a) is a schematic view for describing the sulfur component adhesion-desorption function of the lean $NO_x$ catalyst in the exhaust purifying apparatus for an in-cylinder injection type internal combustion engine according to one embodiment of the present invention and is a diagram showing the sulfur component adhesion function;

FIG. 5(b) is a schematic view for describing the sulfur component adhesion-desorption function of the lean $NO_x$ catalyst in the exhaust purifying apparatus for an in-cylinder injection type internal combustion engine according to one embodiment of the present invention and is a diagram showing the sulfur component desorption function;

BEST MODE FOR CARRYING OUT THE INVENTION

An embodiment of the present invention will hereinafter be described with reference to the drawings.

FIGS. 1 through 7 show an exhaust purifying apparatus (exhaust emission control system) for an in-cylinder injection type internal combustion engine according to one embodiment of the present invention.

Figure 3:
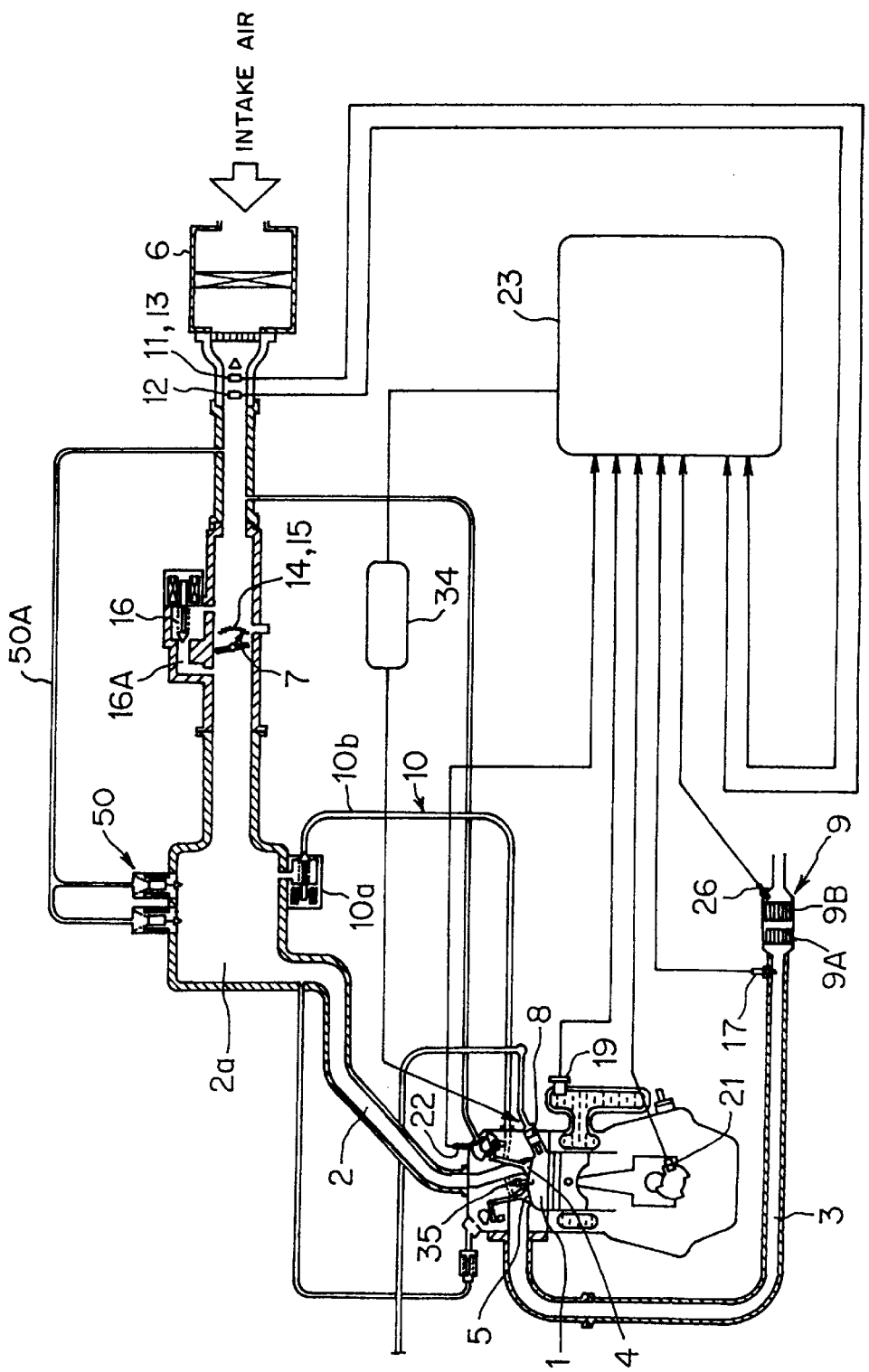
FIG. 3 is an overall constitution diagram of the in-cylinder injection type internal combustion engine according to the one embodiment of the present invention.

First, a description will be made of the in-cylinder injection type internal combustion engine equipped with the exhaust purifying apparatus of the present invention. This internal combustion engine, as shown in FIG. 3, is an internal combustion engine equipped with an intake stroke, a compression stroke, an expansion stroke, and an exhaust stroke in one operating cycle, i.e., a four-cycle engine, and is constituted as an in-cylinder injection type internal combustion engine (in-cylinder injection engine) which is of a spark ignition type and also injects fuel directly into a combustion chamber.

To a combustion chamber 1 an intake passage 2 and an exhaust passage 3 are connected so that they can be communicated with each other. The intake passage 2 and the combustion chamber 1 are controlled by an intake valve 4 so that they are opened or closed, and the exhaust passage 3 and the combustion chamber 1 are controlled by an exhaust valve 5 so that they are opened or closed.

Also, in the intake passage 2, an air cleaner 6 and a throttle valve 7 are provided in this order from the upstream side. In the exhaust passage 3, a catalytic converter 9 for exhaust gas purification and a muffler (silencer) (not shown) are provided in this order from the upstream side. Note that the intake passage 2 is provided with a surging tank 2a.

In addition, an exhaust gas recirculation system (hereinafter referred to as an EGR system) 10 is arranged. In other words, an exhaust recirculating passage 10b is provided so as to connect the surging tank 2a of the intake passage 2 and the upstream side of the exhaust passage 3 together, and an EGR valve 10a is attached to this exhaust recirculating passage 10b.

And with this EGR valve 10a, the flow rate of emission gas (also called exhaust or exhaust gas or flue gas) can be controlled. Note that the control of the EGR valve 10a is performed according to the operating state of the engine.

Additionally, the opening angle of the throttle valve 7 varies according to the depression quantity of the accelerator pedal (not shown), and with this, the quantity of air which is introduced into the combustion chamber 1 is adjusted. Furthermore, 16 is an idle speed control valve (ISC valve), which is provided in a bypass path 16A bypassing the installation portion of the throttle valve 7 of the intake passage 2. The valve 16 is driven to be opened and closed by a stepper motor (not shown), and finely adjusts idling engine speed primarily when the throttle valve 7 is fully closed or almost fully closed.

50 is an air bypass valve (ABV), which is provided in a bypass path 50A communicating the intake passage 2 on the upstream side of the throttle valve 7 and the surging tank 2a together so as to bypass the installation portion of the throttle valve 7 of the intake passage 2. The ABV 50 adjusts an intake quantity separately from the throttle valve 7, thereby adjusting an air-fuel ratio.

An injector (fuel injection valve) 8 is arranged so that its opening faces the combustion chamber 1, in order to inject fuel directly into the combustion chamber 1 of the cylinder. Also, it is a matter of course that this injector 8 is provided in every cylinder. For example, assuming the engine of this embodiment is an in-line four-cylinder engine, four injectors 8 will be provided.

With constitution such as this, the air drawn in through the air cleaner 6 in correspondence to the opening angle of the throttle valve 7 is drawn into the combustion chamber 1 by opening the intake valve 4. Within this combustion chamber 1, the air drawn in is mixed with fuel injected directly from the injector 8. The mixture has been burned within the combustion chamber 1 by igniting a spark plug 35 at proper timing. After engine torque has been generated, the burned gases are exhausted from the combustion chamber 1 into the exhaust passage 3 as exhaust gases. After three harmful components in the exhaust gases, CO, HC, and $NO_x$ have been purified with a catalytic converter (hereinafter also referred as to simply a catalyst) 9, the purified gases are desorbed into the atmosphere, silencing the sound made by a muffler.

Particularly, the engine of the present invention is an engine which can perform economic operation, making an air-fuel ratio lean. During a lean operation, $NO_x$ in the exhaust gases cannot be sufficiently purified with an ordinary three-way catalyst alone, so the catalyst 9 consists of a combination of a lean $NO_x$ catalyst ($NO_x$ catalyst) 9A and a three-way catalyst 9B. In the other words, the three-way catalyst 9B with a three-way function which can purify CO, HC and $NO_x$ in exhaust gases under a stoichiometric air-fuel ratio is provided downstream of the lean $NO_x$ catalyst 9A. Among these catalysts, the lean $NO_x$ catalyst 9A is related to the present invention, and a detailed description thereof will be given later.

The engine of the present invention will be described further. The engine is constructed so that the intake flow introduced from the intake passage 2 into the combustion chamber 1 forms a longitudinal vortex (reverse tumble flow), and within the combustion chamber 1, the intake flow forms a longitudinal vortex flow. Therefore, for example, a small quantity of fuel is collected only in the vicinity of the spark plug 35 arranged in the center of the vertex portion of the combustion chamber 1 by utilizing this longitudinal vortex flow, whereby a portion remote from the spark plug 35 can be made to be in an super lean air-fuel ratio state. If only the vicinity of the spark plug 35 is caused to be in a state of stoichiometric air-fuel ratio or a state of rich air-fuel ratio, fuel consumption can be suppressed realizing stable stratified-charge combustion (stratified super lean combustion). The optimum fuel injection timing in this case is at the latter period of the compression stroke in which an air flow is weak.

Also, in the case of obtaining high output from this engine, pre-mixture combustion needs to be preformed with the fuel from the injector 8 made uniform in quality over the entire combustion chamber 1 and also with the entire combustion chamber 1 caused to be in a mixture state of stoichiometric air-fuel ratio or lean air-fuel ratio. Of course, higher output is obtained by a stoichiometric air-fuel ratio than by a lean air-fuel ratio, and even in these cases, higher output can be efficiently obtained by performing fuel injection at timing such that atomization and gasification of fuel are sufficiently performed. The optimum fuel injection timing in such cases is set so that fuel injection ends during the intake stroke so that the atomization and gasification of fuel can be promoted by taking advantage of an intake flow.

Incidentally, various kinds of sensors are provided for controlling this engine. First, on the side of the intake passage 2, an air flow sensor 11 for detecting an intake air volume from Karman's vortex information, an intake temperature sensor 12 for detecting intake air temperature, and an atmospheric pressure sensor 13 for detecting atmospheric pressure are provided in the installation portion of the air cleaner, and a potentiometer type throttle sensor 14 for detecting an opening angle of the throttle valve 7, an idle switch 15 for detecting an idling state, etc., are provided in the installation portion of the throttle valve.

In addition, on the side of the exhaust passage 3, an oxygen concentration sensor 17 for detecting the concentration of oxygen ($O_2$ concentration) in exhaust gases (hereinafter referred to as simply an $O_2$ sensor) is provided in the upstream side portion of the catalyst 9, and also a catalytic temperature sensor (high temperature sensor) 26 for detecting temperature $\theta_{c.c}$ of the catalyst 9 or the vicinity (hereinafter referred to as catalytic temperature $\theta_{c.c}$) is provided in the downstream side portion of the catalyst 9.

Figure 2:
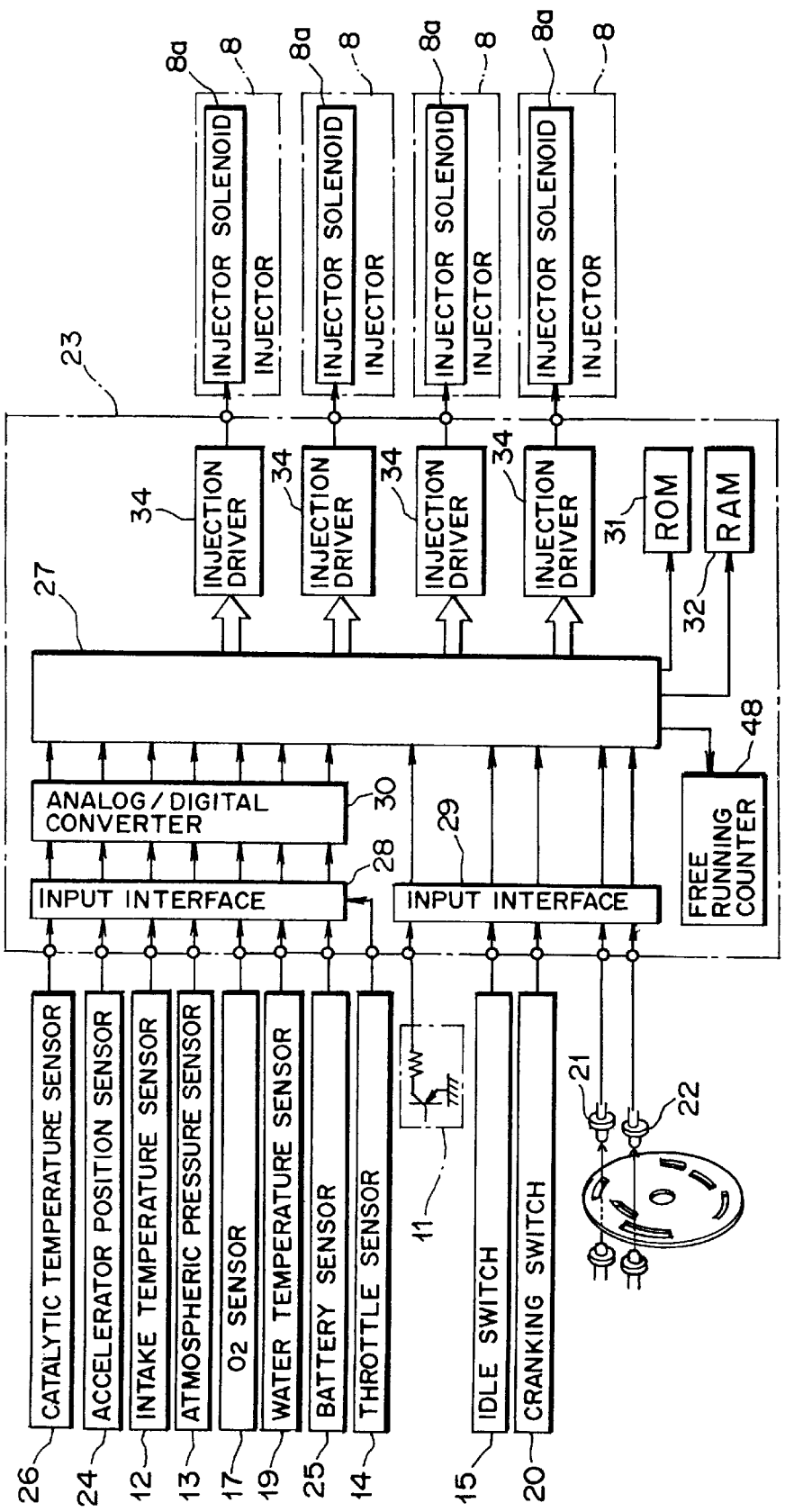
FIG. 2 is a control block diagram of the in-cylinder injection type internal combustion engine according to the one embodiment of the present invention.

Furthermore, as for other sensors, a water temperature sensor 19 for detecting an engine cooling water temperature is provided, and as shown in FIG. 2, a crank angle sensor (crank angle detection means) 21 for detecting a crank angle (this crank angle sensor 21 is also used as a revolution speed sensor for detecting an engine revolution speed) and a TDC sensor (cylinder identification sensor) 22 for detecting top dead center in the first cylinder (reference cylinder) are provided near cams, respectively.

Detection signals from these sensors are input to an electronic control unit (ECU) 23.

Note that voltage signals from an accelerator position sensor 24 for detecting a depression quantity of the accelerator pedal and a battery sensor 25 for detecting a battery voltage and a signal from a cranking switch [or an ignition switch (key switch)] 20 for detecting when the engine is started are also input to the ECU 23.

Incidentally, the hardware constitution of the ECU 23 is shown in FIG. 2. The ECU 23 is provided with a central processing unit (CPU) 27 as its main portion. To this CPU 27, detection signals from the intake temperature sensor 12, atmospheric pressure sensor 13, throttle sensor 14, $O_2$ sensor 17, water temperature sensor 19, accelerator position sensor 24, catalytic temperature sensor 26, and the battery sensor 25 are input through an input interface 28 and an analog/digital converter 30, and detection signals from the air flow sensor 11, crank angle sensor 21, TDC sensor 22, idle switch 15, cranking switch 20, ignition switch, etc., are input through an input interface 29.

Furthermore, the CPU 27 transmits and receives data through a bus line between itself and a ROM 31 for storing program data and fixed value data, a RAM 32 which is updated and overwritten in sequence, a free running counter 48, and a battery backup RAM (not shown) backed up by holding the stored contents while a battery is connected.

Note that data within the RAM 32 will be cleared and reset if the ignition switch is turned off.

Also, fuel injection control signals, based on the result of computation in the CPU 27, are input to the solenoids (injector solenoids) 8a of the injectors 8 through injection drivers (fuel injection valve drive means) 34 of the cylinders (here, four cylinders).

And from the characteristics of an in-cylinder injection engine such as the above-mentioned, this engine is provided, as modes of fuel injection, with a late injection mode (late lean operating mode) which performs a fuel injection during a compression stroke (particularly, the second half of a compression stroke) in order to realize a lean operation by a stratified super lean combustion and enhance fuel consumption, an early injection mode (early lean operating mode) which performs a fuel injection during an intake stroke (particularly, the first half of an intake stroke) in order to realize a lean operation by pre-mixture combustion and obtain output by slow acceleration, a stoichiometric mode (stoichiometric operating mode) which performs a fuel injection during an intake stroke in order to realize a stoichiometric operation (stoichiometric air-fuel ratio operation) by pre-mixture combustion and enhance output in comparison with the early injection mode, and an enriched mode (open loop mode) which realizes a rich operation (in which an air-fuel ratio is less than a stoichiometric air-fuel ratio) by a pre-mixture combustion and enhances output in comparison with the stoichiometric operating mode. These modes are switched according to the engine operating state. Note that a switch of the above-mentioned operating modes refers to a switch of engine combustion states.

The exhaust purifying apparatus of the present invention is equipped in such an engine (in-cylinder injection type internal combustion engine). Here, a description will be made of the exhaust purifying apparatus of the present invention.

First, the principles of this apparatus will be described.

Here, the lean $NO_x$ catalyst 9A will be described. This lean $NO_x$ catalyst 9A is a catalyst of the type which purifies $NO_x$ in exhaust gases by adhering $NO_x$ to a catalyst (an occlusion type lean $NO_x$ catalyst and a trap type lean $NO_x$ catalyst). As shown in FIG. 4(a), the lean $NO_x$ catalyst 9A is constituted of alumina $Al_2O_3$ (carrier), barium Ba, platinum Pt, and rhodium Rh carried on the carrier.

This lean $NO_x$ catalyst 9A has a $NO_x$ adhesion-desorption function of adhering $NO_x$ in exhaust gases to itself in an excess oxygen concentration condition and desorbing the adhered $NO_x$ if oxygen concentration is reduced.

The $NO_x$ adhesion-desorption function in this lean $NO_x$ catalyst 9A is such that in an excess oxygen concentration condition (lean condition), as shown in FIG. 4(b), $O_2$ first adheres to the surface of platinum Pt and then NO in exhaust gases reacts with $O_2$ on the surface of platinum Pt and becomes $NO_2$ ($2NO + O_2 \rightarrow 2NO_2$).

On the other hand, part of Ba carried by the lean $NO_x$ catalyst 9A reacts with $O_2$ and becomes barium oxide BaO. This barium oxide BaO further reacts with CO, etc. in exhaust gases and becomes a carbonate $BaCO_3$.

Under such a state, part of the generated $NO_2$ further reacts with the carbonate ($BaCO_3$) generated from barium oxide BaO and CO, and a nitrate [$Ba(NO_3)_2$] is generated and adheres to the lean $NO_x$ catalyst 9A.

If such reaction is shown with a chemical reaction formula, it becomes like the following Reaction Formula (1):

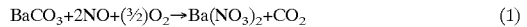

$$BaCO_3 + 2NO + (3/2)O_2 \rightarrow Ba(NO_3)_2 + CO_2 \qquad (1)$$

On the other hand, in the condition in which oxygen concentration has been reduced (rich condition), as shown in FIG. 4(c), the generation quantity of $NO_2$ is reduced and reaction advances in the opposite direction, whereby $NO_2$ is desorbed from the lean $NO_x$ catalyst 9A.

In other words, the nitrite [$Ba(NO_3)_2$] adhered to the lean $NO_x$ catalyst 9A and CO in exhaust gases react with each other on the surface of platinum Pt, and $NO_2$ and a carbonate ($BaCO_3$) are generated, whereby $NO_2$ is desorbed from the lean $NO_x$ catalyst 9A. If this is shown with a chemical reaction formula, it becomes like the following Reaction Formula (2):

$$BaCO_3 + 2NO + O_2 \leftarrow Ba(NO_3)_2 + CO \qquad (2)$$

In Formula (2), $2NO + O_2 \rightarrow 2NO_2$. (Note that part of NO is exhausted as it is.)

Next, the desorbed $NO_2$ is deoxidized by unburned HC and CO in exhaust gases and is exhausted as $N_2$.

Thus, in the lean $NO_x$ catalyst 9A, a nitrite [$Ba(NO_3)_2$] and a carbonate ($BaCO_3$) are present in a chemical equilibrium state, and a reaction in each direction will take place according to a condition near the lean $NO_x$ catalyst 9A.

Therefore, as shown in the above-mentioned Formula (2), in a state in which residual oxygen concentration is considerably low, if a large quantity of CO which is the material of a carbonate ($BaCO_3$) is supplied, a chemical reaction in a direction which consumes this CO, i.e., a chemical reaction in a direction which resolves a nitrite [Ba(NO$_3$)$_2$] and generates a carbonate (BaCO$_3$) [a chemical reaction in a direction of reaction from right to left in Formula (2)] will advance. Therefore, with this, NO$_x$ adhered to the lean NO$_x$ catalyst 9A can be desorbed.

For this reason, in the embodiment of the present invention, in a state in which residual oxygen concentration is considerably low, a large supply of CO which is the material of a corbonate (BaCO$_3$) (i.e., a large supply of unburned or incompletely burned gases) is performed, thereby moving the above-mentioned chemical equilibrium, reliably removing NO$_x$ adhered to the lean NO$_x$ catalyst 9A, and maintaining the function of the lean NO$_x$ catalyst 9A. For this reason, additional fuel injection is performed as described later.

In addition, such a lean NO$_x$ catalyst 9A also has the property of adhering SO$_x$ in exhaust gases to itself in an excess oxygen concentration condition and desorbing the adhered SO$_x$ if oxygen concentration is reduced.

In other words, in this lean NO$_x$ catalyst 9A, as shown in FIG. 5, in an excess oxygen concentration condition, O$_2$ adheres to the surface of platinum Pt, and the sulfur component, contained in fuel or a lubricating oil, is exhausted as SO$_2$ after combustion. SO$_2$ contained in the exhaust gases reacts with O$_2$ on the surface of platinum Pt and becomes SO$_3$ (2SO$_2$+O$_2$→2SO$_3$). Then, part of the generated SO$_3$ couples with barium oxide BaO on the surface of platinum Pt, and a sulfate (BaSO$_4$) is generated and adheres to the lean NO$_x$ catalyst 9A.

If this is shown with a chemical reaction formula, it becomes like the following Reaction Formula (3):

$$BaCO_3+SO_2+(\tfrac{1}{2})O_2 \rightarrow BaSO_4+CO_2 \tag{3}$$

If a chemical reaction such as this takes place, Ba carried by the lean NO$_x$ catalyst 9A will be a sulfate (BaSO$_4$) and a nitrite [Ba(NO$_3$)$_2$] will not be generated by this amount. Therefore, the chemical equilibrium between the sulfate (BaSO$_4$) and the carbonate (BaCO$_3$) will move in a direction which resolves the sulfate (BaSO$_4$), and the NO$_x$ adhesion ability of the sulfate (BaSO$_4$) will be reduced and therefore the performance will be reduced.

On the other hand, in a condition in which oxygen concentration has been reduced, a portion of the sulfate (BaSO$_4$) adhered to the lean NO$_x$ catalyst 9A and CO in exhaust gases react with each other on the surface of platinum Pt, SO$_3$ and a carbonate (BaCO$_3$) are generated, and SO$_3$ is desorbed from the lean NO$_x$ catalyst 9A. If this is shown with a chemical reaction formula, it becomes like the following Reaction Formula (4):

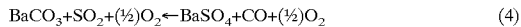

$$BaCO_3+SO_2+(\tfrac{1}{2})O_2 \leftarrow BaSO_4+CO+(\tfrac{1}{2})O_2 \tag{4}$$

Then, the desorbed SO$_3$ is deoxidized by unburned HC and CO in exhaust gases.

Figure 7A:
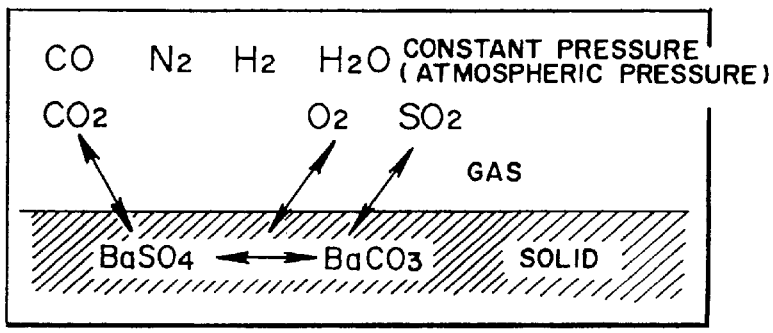
FIG. 7(a) is a diagram for describing a chemical reaction in the exhaust purifying apparatus for an in-cylinder injection type internal combustion engine according to the one embodiment of the present invention and shows the equilibrium state of the chemical reaction.
Figure 7B:
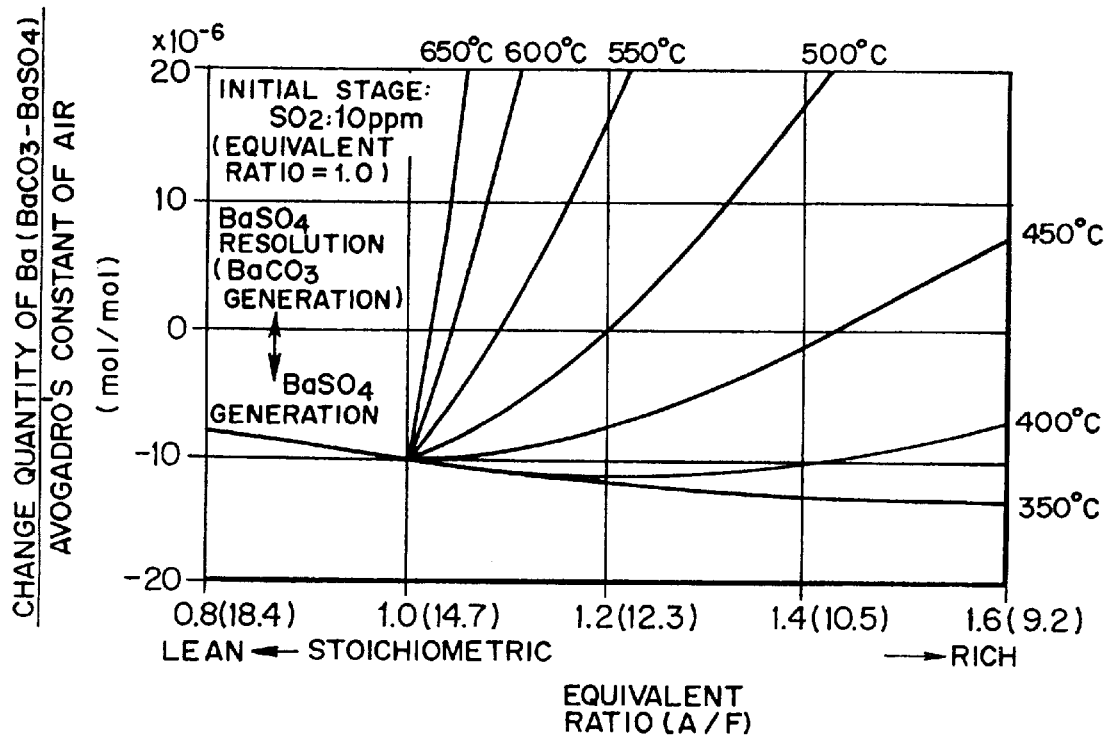
FIG. 7(b) is a diagram for describing a chemical reaction in the exhaust purifying apparatus for an in-cylinder injection type internal combustion engine according to the one embodiment of the present invention and shows the relation between chemical reaction and temperature.

Thus, in the lean NO$_x$ catalyst 9A, as shown in FIG. 7(a), a carbonate (BaCO$_3$) and a sulfate (BaSO$_4$) are present in a chemical equilibrium state, and a reaction in each direction becomes easy to advance according to a condition near the lean NO$_x$ catalyst 9A. In other words, FIG. 7(b) is obtained by chemical equilibrium calculation, and as shown in FIG. 7(b), as an air-fuel ratio becomes smaller (i.e., as an air-fuel ratio becomes lean), the sulfate (BaSO$_4$) becomes easy to resolve and the carbonate (BaCO$_3$) becomes easy to generate. Conversely, as an air-fuel ratio becomes greater (i.e., as an air-fuel ratio becomes lean), the carbonate (BaCO$_3$) becomes easy to resolve and the sulfate (BaSO$_4$) becomes easy to generate.

Also, the lean NO$_x$ catalyst 9A, in addition to a property such as this, has the property that a reaction in each direction becomes easy to advance according to temperature near the vicinity of the lean NO$_x$ catalyst 9A. In other words, the lean NO$_x$ catalyst 9A, as shown in FIG. 7(b), has the property that as temperature rises, the sulfate (BaSO$_4$) becomes easy to resolve and the carbonate (BaCO$_3$) becomes easy to generate. If the lean NO$_x$ catalyst 9A reaches a high temperature, part of the sulfate (BaSO$_4$) adhered to the lean NO$_x$ catalyst 9A will resolve thermally.

If attention is paid to such properties and if the temperature of exhaust gases supplied to the lean NO$_x$ catalyst 9A is made high (generally, about 600° C. or greater), the thermal resolution of the sulfate (BaSO$_4$) adhered to the lean NO$_x$ catalyst 9A will take place. If this is shown with a chemical reaction formula, it becomes like the following Reaction Formula (5):

$$BaSO_4 \rightarrow BaO+SO_2+(\tfrac{1}{2})O_2 \tag{5}$$

Thus, if the vicinity of the lean NO$_x$ catalyst 9A is made to be in a condition in which oxygen concentration has been reduced and is also made high in temperature (e.g., about 600° C. or greater), the resolution of the sulfate (BaSO$_4$) adhered to the lean NO$_x$ catalyst 9A by a chemical change will be promoted and also thermal resolution will take place, so the sulfur component can be reliably desorbed from the lean NO$_x$ catalyst 9A.

Hence, the present invention, as described later, injects additional fuel during an expansion stroke, makes the temperature of exhaust gases high, and makes the condition in exhaust gases an oxygen concentration reduction condition, thereby reliably desorbing the sulfur component from the lean NO$_x$ catalyst 9A.

In other words, in a state in which residual oxygen concentration has been made low, CO which is the material of the carbonate (BaCO$_3$) is supplied; the nitrite [Ba(NO$_3$)$_2$] adhered to the lean NO$_x$ catalyst 9A is resolved and is also desorbed as NO$_2$; and part of the sulfate (BsSO$_4$) adhered to the lean NO$_x$ catalyst 9A is resolved by a chemical reaction and is desorbed as SO$_3$, whereby NO$_x$ and a sulfur component (SO$_x$) are desorbed from the lean NO$_x$ catalyst 9A. Furthermore, to desorb the sulfate (BaSO$_4$) remaining on the lean NO$_x$ catalyst 9A, the sulfate (BaSO$_4$) is moved in a direction in which the chemical equilibrium between the sulfate (BaSO$_4$) and the carbonate (BaCO$_3$) resolves the sulfate (BaSO$_4$), by raising exhaust gas temperature, and is also resolved thermally, whereby a reduction in the NO$_x$ adhesion ability of the lean NO$_x$ catalyst 9A is prevented.

Note that the desorbed NO$_2$ is deoxidized by HC and is exhausted as N$_2$.

For this reason, additional fuel injection is made so that it is performed within an expansion stroke of each cylinder (if possible, timing near the end period of the expansion stroke is preferable), on the basis of the NO$_x$ quantity (estimated NO$_x$ quantity) and SO$_x$ quantity (estimated SO$_x$ quantity) adhered to the lean NO$_x$ catalyst 9A and, furthermore, in consideration of an ensurrance of HC and CO as a deoxidating agent in exhaust gases and the influence on an engine output torque.

Figure 1:
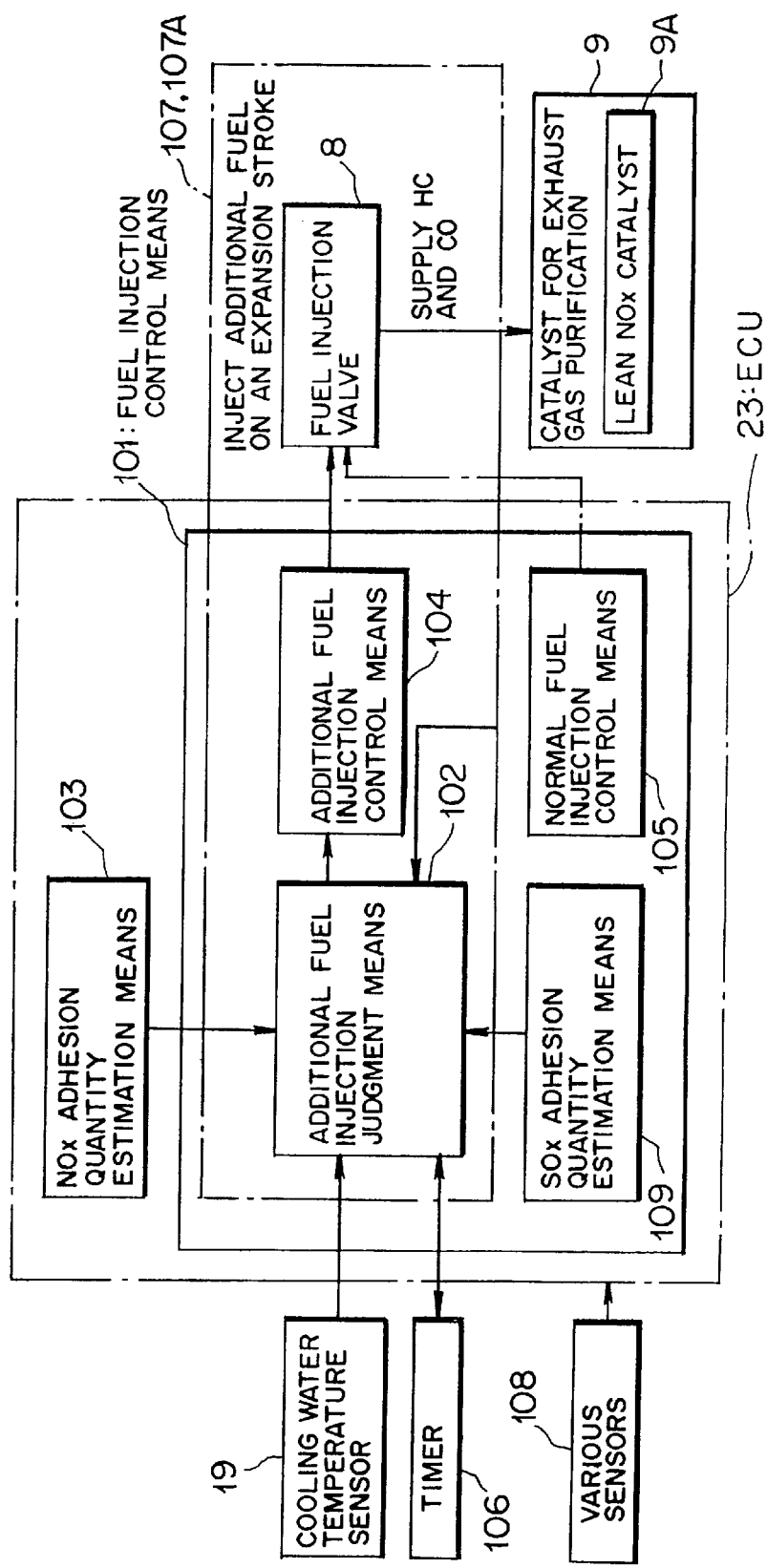
FIG. 1 is a block diagram showing schematically the essential constitution of the control system of an exhaust purifying apparatus for an in-cylinder injection type internal combustion engine according to one embodiment of the present invention.

Hence, the apparatus of the present invention, as shown in FIG. 1, has a lean NO$_x$ catalyst (NO$_x$ catalyst) 9A, NO$_x$ adhesion quantity estimation means 103 for estimating the adhesion quantity of NO$_x$ adhered to the lean NO$_x$ catalyst 9A, and NO$_x$ desorption means 107A for positively desorbing NO$_x$ adhered to the lean NO$_x$ catalyst 9A. The apparatus is also equipped with sulfur component adhesion quantity estimation means (SO$_x$ adhesion quantity estimation means)

109 for estimating the adhesion quantity of a sulfur component adhered to this lean $NO_x$ catalyst 9A, and sulfur component desorption means 107 for desorbing the sulfur component adhered to the lean $NO_x$ catalyst 9A from the lean $NO_x$ catalyst 9A.

That is, in the apparatus of the present invention, separately from the aforementioned fuel injection (main injection) for normal combustion within a combustion chamber, additional fuel is injected at timing which has little influence on engine output, and this additional fuel is burned. With this, in the $NO_x$ desorption means 107A, appropriate concentrations of HC and CO are supplied to the lean $NO_x$ catalyst 9A and a chemical reaction is promoted, whereby $NO_x$ adhered to the lean $NO_x$ catalyst 9A is desorbed. In addition, in the sulfur component desorption means 107, HC and CO similar to this $NO_x$ desorption function are supplied and also the temperature of exhaust gases is raised, whereby chemical equilibrium is moved and thermal resolution advances. With this, the sulfur component ($SO_x$) is desorbed from the lean $NO_x$ catalyst 9A.

Thus, the $NO_x$ desorption means 107A and the sulfur component desorption means 107 both perform the desorption of $NO_x$ and the desorption of a sulfur component by making use of fuel injection control (injector drive control). These $NO_x$ desorption means 107A and sulfur component desorption means 107, as shown in a block diagram of FIG. 1, are constituted by additional fuel injection judgment means 102, additional fuel injection control means 104, and fuel injection valve 8, equipped as part of fuel injection control means 101 for performing fuel injection control. Note that of course, the fuel injection control means 101 is equipped with normal fuel injection control means 105 associated with main fuel injection.

Here, the constituents shown in FIG. 1 will be described.

First, the $NO_x$ adhesion quantity estimation means 103 estimates an $NO_x$ quantity adhered to the lean $NO_x$ catalyst 9A, based on a total fuel injection quantity which is obtained from the integrated value of injector drive periods during a lean operating mode.

Note that the $NO_x$ adhesion quantity estimation means 103 is not limited to this, but may be constituted so as to estimate the $NO_x$ quantity adhered to the lean $NO_x$ catalyst 9A, based on an $NO_x$ quantity detected by an $NO_x$ sensor.

Also, the $SO_x$ adhesion quantity estimation means 109 estimates a $SO_x$ quantity adhered to the lean $NO_x$ catalyst 9A, based on a total fuel injection quantity which is obtained from the integrated value of injector drive periods of all operating modes.

Note that the $SO_x$ adhesion quantity estimation means 109 is not limited to this, but may be constituted so as to estimate the $SO_x$ quantity adhered to the lean $NO_x$ catalyst 9A, based on the traveled distance of a vehicle.

Also, the additional fuel injection judgment means 102 judges whether or not additional fuel injection control is needed in order to desorb $NO_x$ or $SO_x$ adhered to the lean $NO_x$ catalyst 9A and is constructed so that it judges whether or not a condition for starting these controls (control start condition) and a condition for releasing these controls (control release condition) have been met.

Here, for the control start condition for desorbing $NO_x$ adhered to the lean $NO_x$ catalyst 9A, it is set such that the $NO_x$ adhesion quantity is equal to or greater than a predetermined value and also that main combustion is in a lean operating mode (e.g., a late lean operating mode) and 2-stage combustion is possible [that the air-fuel ratio (A/F) of main combustion is, for example, equal to or greater than 20 and that water temperature WT is equal to or greater than 10° C.] (all are "AND" conditional).

In this embodiment, whether the $NO_x$ adhesion quantity is equal to or greater than a predetermined value is judged based on an $NO_x$ adhesion quantity which is estimated by the $NO_x$ adhesion quantity estimation means 103, and this result of judgment is sent to the additional fuel injection judgment means 102.

Also, whether the air-fuel ratio (A/F) of main combustion is equal to or greater than 20 (i.e., whether the air-fuel ratio is lean) is judged based on an air-fuel ratio of main combustion which is set by the normal fuel injection control means 105. For this reason, the information on an air-fuel ratio is sent from the normal fuel injection control means 105 to the additional fuel injection judgment means 102. The reason that this is made a condition is that since a large quantity of oxygen is present in exhaust gases, additional fuel can be reliably burned.

Furthermore, whether water temperature WT is equal to or greater than 10° C. is judged based on the detection signal from the cooling water temperature sensor 19. For this reason, the detection information from the cooling water temperature sensor 19 is sent to the additional fuel injection judgment means 102. The reason that this is made a condition is that if water temperature is too low, the occurrence of self-ignition will become difficult even if additional fuel injection were performed.

On the other hand, for the control start condition for desorbing $SO_x$ adhered to the lean $NO_x$ catalyst 9A, it is set such that the $SO_x$ adhesion quantity is equal to or greater than a predetermined value, that the air-fuel ratio (A/F) of main combustion is, for example, in a lean operating mode of 20 or more (e.g., a late lean operating mode or an early lean operating mode), and that water temperature WT is equal to or greater than 10° C. (all are "AND" conditional).

In this embodiment, whether the $SO_x$ adhesion quantity is equal to or greater than a predetermined value is judged based on a $SO_x$ adhesion quantity which is estimated by the $SO_x$ adhesion quantity estimation means 109, and this result of judgment is sent to the additional fuel injection judgment means 102.

Note that since the judgment of whether the air-fuel ratio (A/F) of main combustion is equal to or greater than 20 and the judgment of whether water temperature WT is equal to or greater than 10° C. are the same as the aforementioned control start condition for desorbing $NO_x$, in this embodiment a description thereof is omitted.

In this manner, the additional fuel injection judgment means 102 performs the judgment of whether or not control start conditions have been met. In the case where all of these control start conditions have been met, this additional fuel injection judgment means 102 sends a signal to the additional fuel injection control means 104 in order to perform additional fuel injection.

Next, a description will be made of the release condition of the control for resorbing $NO_x$ or $SO_x$ adhered to the lean $NO_x$ catalyst 9A.

First, for the control release condition for resorbing $NO_x$ adhered to the lean $NO_x$ catalyst 9A, it is set such that a predetermined period (e.g., order of 5 sec) has elapsed since additional fuel injection control was started.

It is performed, based on the result of count of a timer 106, whether or not a predetermined period has elapsed since additional fuel injection control was started. For this reason, when the additional fuel injection control is started, the timer 106 will start the count, and the counted value of the timer 106 will be sent to the additional fuel injection judgment means 102.

On the other hand, for the control release condition for resorbing $SO_x$ adhered to the lean $NO_x$ catalyst 9A, it is set such that a predetermined period (e.g., order of 5 min) has elapsed since additional fuel injection control was started.

It is also performed, based on the result of count of the timer 106, whether or not a predetermined period has elapsed since additional fuel injection control was started. For this reason, when the additional fuel injection control is started, the timer 106 will start the count, and the counted value of the timer 106 will be sent to the additional fuel injection judgment means 102.

In this manner, the additional fuel injection judgment means 102 judges whether or not the control release condition has been met, and in the case where this control release condition has been met, the means 102 releases the additional fuel injection control.

In addition, in the case where it has been judged by the additional fuel injection judgment means 102 that additional fuel injection is needed in order to resorb $NO_x$ or $SO_x$ adhered to the lean $NO_x$ catalyst 9A, the additional fuel injection control means 104 sets the injection start time $T_{INJ}$ of additional fuel injection and also sets the injection period of additional fuel of each cycle.

By adjusting these injection start time $T_{INJ}$ and injection period of additional fuel injection, the quantities of HC and CO which are supplied to the lean $NO_x$ catalyst 9A are adjusted. In other words, if the start time $T_{INJ}$ of additional fuel injection is set to a time as late as possible, the time for fuel to be atomized will be insufficient and therefore fuel oxidation can be suppressed, whereby the quantities of HC and CO which are supplied to the lean $NO_x$ catalyst 9A can be increased. Also, if the injection period of additional fuel injection is lengthened, the injection quantity of additional fuel can be increased and therefore the quantities of HC and CO which are supplied to the lean $NO_x$ catalyst 9A can be increased.

First, a description will be made of the setting of the fuel start time $T_{INJ}$ and injection period of additional fuel injection for resorbing $NO_x$.

This injection start time $T_{INJ}$ of additional fuel injection is set so that additional fuel injection is performed during the middle period of an expansion stroke of each cylinder or during the expansion stroke thereafter. In other words, the injection start time $T_{INJ}$ of additional fuel is set, based on the detection information from the crank angle sensor 21 as crank angle detection means, so that additional fuel injection is performed near a crank angle 90° after top dead center of piston compression between the compression and expansion strokes.

The reason that the injection start time $T_{INJ}$ is thus set is for reliably burning the fuel injected by additional fuel injection (hereinafter also referred to as after-burning) and thereby causing CO and a high temperature condition necessary for resorbing $NO_x$ adhered to the lean $NO_x$ catalyst 9A to occur.

If additional fuel injection is performed at the injection start time $T_{INJ}$ set in this manner, pre-flame reaction products will be present with concentration near an ignition limit at a lean mixture portion formed within the combustion chamber by main combustion. Therefore, the total amount with the pre-flame reaction products which arise from additional fuel injected into a high temperature atmosphere within the cylinder exceeds an ignition limit, self-ignition takes place, and the additional fuel burns.

Here, the point of time that the concentration of pre-flame reaction products increases and exceeds an equilibrium concentration and also that the pre-flame reaction speed advances exponentially explosively is referred to as ignition. At this point of time, flame (thermal flame) occurs. The pre-flame reaction products are active chemical reaction seeds which are effective for thrusting a chain branch reaction, and they are, for example, CHO, $H_2O_2$, OH, etc.

Specifically, the additional fuel injection control means 104 sets injection start time $T_{INJ}$ by correcting for basic fuel injection start time $Tb_{INJ}$ which is a base in additional fuel injection on this expansion stroke by cooling water temperature $\theta_W$, a quantity of EGR, and ignition time $T_{IG}$ in main combustion. For this reason, a start time map for additional fuel injection previously set based on the target A/F of main combustion is equipped in the ECU 23.

Also, the injection period of additional fuel injection, i.e., injector drive period $t_{PLUS}$ is set so that the air-fuel ratio of an exhaust (exhaust target air-fuel ratio) which is supplied to the lean $NO_x$ catalyst 9A reaches the order of about 14. That is, the air-fuel ratio of the total injection quantity of additional fuel injection added to the fuel injection quantity of main combustion is set so as to reach the order of about 14. The reason that the air-fuel ratio is thus set is that there is a need to supply much HC and CO to the lean $NO_x$ catalyst 9A in order to desorb $NO_x$ from the lean $NO_x$ catalyst 9A.

Specifically, the additional fuel injection control means 104 sets an injector drive period $t_{PLUS}$ by correcting for a basic drive period $t_B$ which is a base in additional fuel injection on the expansion stroke by injection start time $T_{INJ}$.

For this reason, a map for $NO_x$ desorption, previously set based on the target A/F of main combustion, is equipped in the ECU 23. This map for $NO_x$ desorption is set so that the exhaust target air-fuel ratio reaches the order of about 14. And this map for $NO_x$ desorption is selected by the additional fuel injection control means 104 in setting an injector drive period $t_{PLUS}$ in the case where additional fuel injection for desorbing $NO_x$ is performed.

Next, a description will be made of the setting of the injection start time $T_{INJ}$ and injection period of additional fuel injection for resorbing $SO_x$.

In this case, the injection start time $T_{INJ}$ of additional fuel injection is set to a time such that exhaust gas temperature reaches approximately 600° C. or greater. This is for promoting the chemical change of a sulfate ($BaSO_4$) adhered to the lean $NO_x$ catalyst 9A and also promoting thermal resolution, by causing exhaust gas temperature to reach approximately 600° C. or greater.

Note that in this embodiment of the present invention, the additional fuel injection control will end if it continues for a predetermined period (order of about 5 min), and therefore, there is a little possibility of an excessive rise in the temperature of the lean $NO_x$ catalyst 9. However, in consideration of the durability of the lean $NO_x$ catalyst 9A and in order to prevent an excessive rise in the temperature of the lean $NO_x$ catalyst 9A reliably, it is preferable to adjust exhaust gas temperature, based on detection information from the catalytic temperature sensor 26, so that it does not reach approximately 800° C. or greater.

This additional fuel injection for desorbing $SO_x$ absorbed to the lean $NO_x$ catalyst 9A is performed under a lean combustion operation. Therefore, when it is estimated that a certain quantity or greater of $SO_x$ has been absorbed to the lean $NO_x$ catalyst 9A, this additional fuel injection will be performed immediately if the operating mode is a lean operating mode. If the operating mode is another operating mode (stoichiometric feedback operating mode or enriched open loop operating mode), the additional fuel injection will wait for a lean operation mode and be performed.

Also, even when the operating mode is switched from a lean operating mode to another operating mode before such additional fuel injection continues for a predetermined period T1 (here, about 5 min), the additional fuel injection is stopped once, and thereafter, the additional fuel injection is again performed when the operating mode is switched to a lean operating mode. In this case, if the accumulated period of the additional fuel injection reaches a predetermined period T2, it is assumed that the present additional fuel injection for desorbing $SO_x$ has been completed.

However, this additional fuel injection is performed by raising the atmosphere temperature of the lean $NO_x$ catalyst 9A up to a predetermined temperature region and also by making the atmosphere of the lean $NO_x$ catalyst 9A a condition of deoxidization, and it takes a certain time until the atmosphere temperature or the lean $NO_x$ catalyst 9A rises to a predetermined level since the additional fuel injection has started. Therefore, in the case where the additional fuel injection is caused to continue for a predetermined period T1 (here, about 5 min), the surroundings of the lean $NO_x$ catalyst 9A reach the temperature of atmosphere which can desorb $SO_x$, for only a period T1–t1 obtained by subtracting time t1 required for the atmosphere temperature of the lean $NO_x$ catalyst 9A to rise to a predetermined level from the predetermined period T1.

If the additional fuel injection is performed while being interrupted in the middle of the injection, the time t1 required for the atmosphere temperature of the lean $NO_x$ catalyst 9A to rise to a predetermined level will be required each time, as described above. (But, if the interval of interruption is short, the time t1 required to rise to this predetermined level will also shorten.) Hence, in the case where additional fuel injection is performed while being interrupted in the middle of the injection, it is desirable to set a predetermined period T2 in consideration of such time required for a rise in temperature.

In this embodiment, the injection start time $T_{INJ}$ of additional fuel is set, based on detection information from the crank angle sensor 21 as crank angle detection means, so that the additional fuel injection is performed near a crank angle 90° after top dead center of piston compression between the compression and expansion strokes.

The reason that the injection start time $T_{INJ}$ is thus set is for reliably burning the fuel injected by additional fuel injection (hereinafter also referred to as after-burning) and thereby raising exhaust gas temperature.

If additional fuel injection is performed at the injection start time $T_{INJ}$ set in this manner, as described above, pre-flame reaction products are present with a concentration near an ignition limit at a lean mixture portion formed within the combustion chamber by main combustion. Therefore, the total amount with the pre-flame reaction products which arise from additional fuel injected into a high temperature atmosphere within the cylinder exceeds an ignition limit, self-ignition takes place, and the additional fuel burns.

The specific setting of the injection start time $T_{INJ}$ is similar to the above-mentioned setting of the injection start time $T_{INJ}$ of the additional fuel injection for desorbing $NO_x$.

Also, the injection period of additional fuel injection, i.e., injector drive period $t_{PLUS}$ is set so that the air-fuel ratio of an exhaust (exhaust target air-fuel ratio) which is supplied to the lean $NO_x$ catalyst 9A reaches the order of about 11. That is, the air-fuel ratio of the total injection quantity of additional fuel injection added to the fuel injection quantity of main combustion is set so as to reach the order of about 11. The reason that the air-fuel ratio is thus set is for causing additional fuel to reliably burn to make exhaust gas temperature high and also for supplying HC and CO as a deoxidating agent, in order to desorb $SO_x$ from the lean $NO_x$ catalyst 9A.

Specifically, the additional fuel injection control means 104 sets an injector drive period $t_{PLUS}$ by correcting for a basic drive period $t_B$ which is a base in additional fuel injection on the expansion stroke by injection start time $T_{INJ}$.

For this reason, a map for $SO_x$ desorption previously set based on the target A/F of main combustion is equipped in the ECU 23. This map for $SO_x$ desorption is set so that the exhaust target air-fuel ratio reaches the order of about 11. And this map for $SO_x$ desorption is selected by the additional fuel injection control means 104 in setting an injector drive period $t_{PLUS}$ in the case where additional fuel injection for desorbing $SO_x$ is performed.

Note that in this case, although $NO_x$ and $SO_x$ adhered to the lean $NO_x$ catalyst 9A both need to be desorbed, desorption of $SO_x$ has priority and a map for $SO_x$ desorption is selected.

Incidentally, the fuel injection control in the normal fuel injection control means 105 is described. This normal fuel injection control means 105 has a function of setting a fuel injection quantity in a normal fuel injection, based on information from various sensors 108.

In other words, the fuel injection quantity is set as a fuel injection period (which is a time to drive an injector and referred to as an injector drive pulse width in actual control) $t_{AU}$. Even in the case of a stoichiometric mode and an early injection mode and even in the case of a late injection mode, a basic drive period $t_P$ is computed based on engine load (intake air quantity per 1 stroke) Q/Ne, a target air-fuel ratio (A/F which will hereinafter be referred to as AF), etc., and the fuel injection period $t_{AU}$ is set in consideration of the engine cooling water temperature detected with the water temperature sensor 19, intake temperature detected with the intake temperature sensor 12, fuel correction coefficient f which is set according to the atmospheric pressure detected with the atmospheric pressure sensor 13, injector dead time $t_D$, etc.

Figure 6:
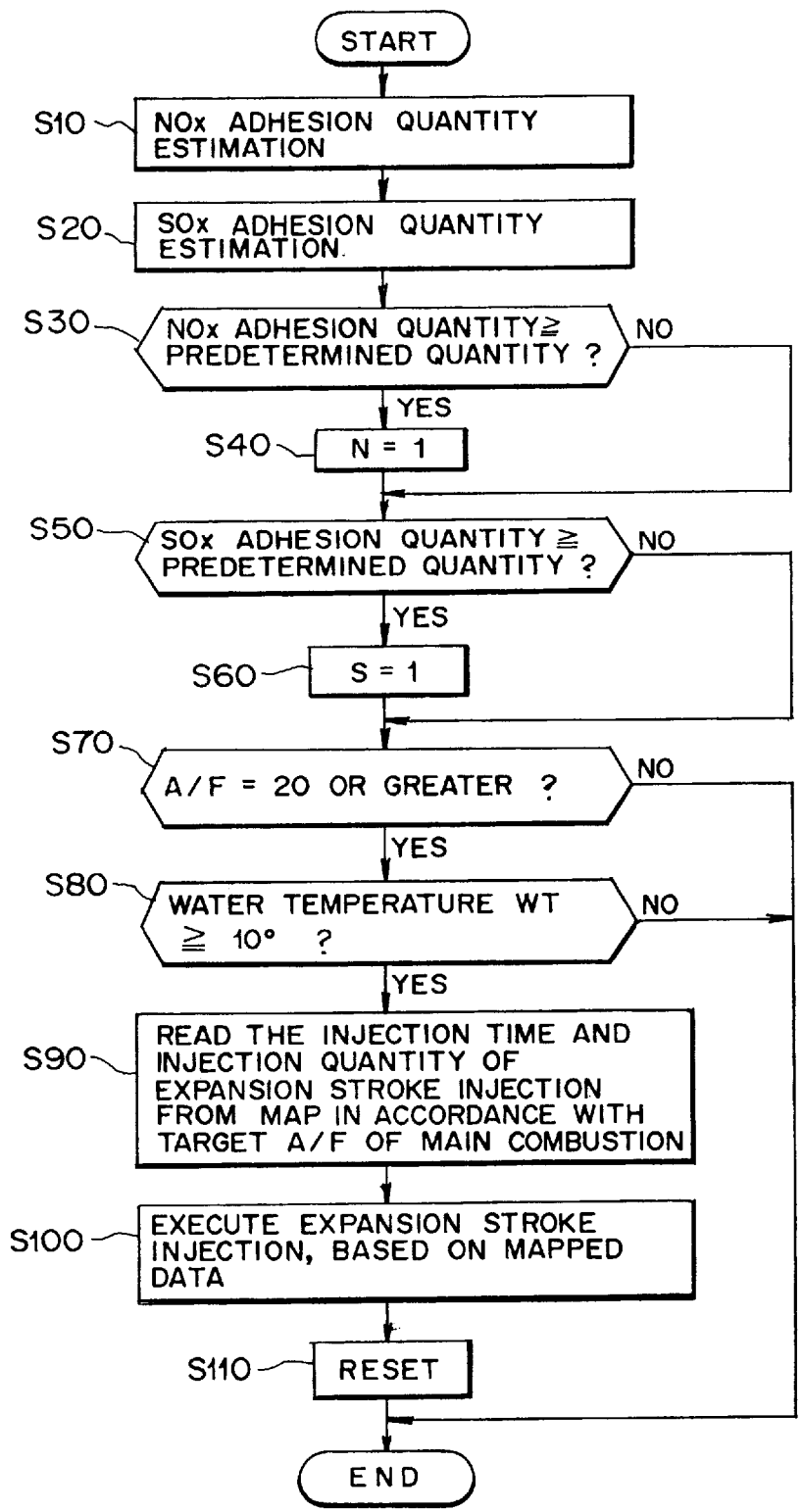
FIG. 6 is a flowchart showing the additional fuel injection control of the exhaust purifying apparatus for an in-cylinder injection type internal combustion engine according to the one embodiment of the present invention.

Since the exhaust purifying apparatus according to this embodiment of the present invention is constituted as described above, control associated with exhaust purification is performed, for example, as shown in a flowchart of FIG. 6. First, in step S10 an $NO_x$ adhesion quantity adhered to the lean $NO_x$ catalyst 9A is estimated by the $NO_x$ adhesion quantity estimation means ($NO_x$ adhesion quantity estimation means) 103. In step S20 a $SO_x$ adhesion quantity adhered to the lean $NO_x$ catalyst 9A is estimated by the $SO_x$ adhesion quantity estimation means ($SO_x$ adhesion quantity estimation means) 109.

And in step S30, the additional fuel injection judgment means 102 judges whether or not the $NO_x$ adhesion quantity estimated by the $NO_x$ adhesion quantity estimation means 103 is equal to or greater than a predetermined quantity. As this result of judgment, in the case where it has been judged that the estimated $NO_x$ adhesion quantity is equal to or greater than a predetermined quantity, step S30 advances to step S40 and a flag N for $NO_x$ desorption is set to 1.

Note that the flag N for $NO_x$ desorption is set to 1 when the map for $NO_x$ desorption is selected and set to 0 when the map for $NO_x$ desorption is not selected. Also, it is set to 0 at the time of initial setting.

Next, in step S50, the additional fuel injection judgment means 102 judges whether or not the $SO_x$ adhesion quantity estimated by the $SO_x$ adhesion quantity estimation means 109 is equal to or greater than a predetermined quantity. As this result of judgment, in the case where it has been judged that the estimated $SO_x$ adhesion quantity is equal to or greater than a predetermined quantity, step S50 advances to step S60 and a flag S for $SO_x$ desorption is set to 1.

Note that the flag S for $SO_x$ desorption is set to 1 when the map for $SO_x$ desorption is selected and set to 0 when the map for $SO_x$ desorption is not selected. Also, it is set to 0 at the time of initial setting.

On the other hand, in step S30, when it is judged that the $NO_x$ adhesion quantity is not equal to or greater than a predetermined value, this step advances to step S50, in which it is judged whether the $SO_x$ adhesion quantity is equal to or greater than a predetermined value.

Also, in step S50, when it is judged that the $SO_x$ adhesion quantity is not equal to or greater than a predetermined value, this step advances to step S70.

In step S70, the additional fuel injection judgment means 102 judges whether or not an air-fuel ratio is equal to or greater than 20. When the air-fuel ratio is equal to or greater than 20, this step advances to step S80.

In step S80, the additional fuel injection judgment means 102 judges whether or not the water temperature detected by the cooling water temperature 19 is equal to or greater than 10° C. When the water temperature WT is equal to or greater than 10° C., this step advances to step S90.

In step S90, the additional fuel injection control means 104 reads the injection start time $T_{INJ}$ and injector drive period $t_{PLUS}$ of the additional fuel injection on the expansion stroke from the map.

In this case, when the flag S for $SO_x$ desorption is 1 (at this time, the flag N for $NO_x$ desorption is also 1), the map for $SO_x$ desorption is selected and the injector drive period $t_{PLUS}$ is set by this map for $SO_x$ desorption. On the other hand, when the flag S for $SO_x$ desorption is 0 (at this time, the flag N for $NO_x$ desorption is 1), the map for $NO_x$ desorption is selected and the injector drive period $t_{PLUS}$ is set by this map for $NO_x$ desorption.

In this manner, after the injection start time $T_{INJ}$ and injector drive period $t_{PLUS}$ of the additional fuel injection on the expansion stroke have been set, step S90 advances to step S100, and based on these injection start time $T_{INJ}$ and injector drive period $t_{PLUS}$, the additional fuel injection on the expansion stroke is performed.

When the additional fuel injection is started, the timer 106 is started at the same time. Whether or not a predetermined period has elapsed since the additional fuel injection was started is judged by whether or not the counted value of the timer 106 has exceeded a predetermined value. As this result of judgment, in the case where it has been judged that a predetermined time has elapsed since the additional fuel injection was started, the additional fuel injection on the expansion stroke is ended on the assumption that $NO_x$ or $SO_x$ adhering to the lean $NO_x$ catalyst 9A was desorbed sufficiently.

And in step S110, the flag N for $NO_x$ desorption and the flag S for $SO_x$ desorption are reset (N=0 and S=0), and this step returns to step S10.

On the other hand, in the case where in step S70 it is judged that an air-fuel ratio is not equal to or greater than 20, and in the case where in step S80 it is judged that the water temperature WT detected by the cooling water temperature 19 is not equal to or greater than 10° C., both cases return without performing the additional fuel injection of the expansion stroke for desorbing $NO_x$ or $SO_x$ adhered to the lean $NO_x$ catalyst 9A.

Since the exhaust purifying apparatus of the present invention is thus operated, it can make additional fuel burn reliably and make the temperature of exhaust gases rise without providing an additional device. Therefore, the sulfur component adhered to the lean $NO_x$ catalyst 9A can be reliably desorbed. With this, there is an advantage that the durability of the lean $NO_x$ catalyst 9A can be enhanced.

Also, since warm-up time is unnecessary and exhaust gas temperature can be made to rise in a short period of time, there is also an advantage that the desorption of the sulfur component from the lean $NO_x$ catalyst 9A by the sulfur component desorption means 107 can be performed in a short period of time.

In addition, since the additional fuel injection is performed according to an adhesion quantity of $SO_x$ estimated by the $SO_x$ adhesion quantity estimation means, there is also an advantage that $SO_x$ adhered to the lean $NO_x$ catalyst 9A can be efficiently desorbed, a reduction in the $NO_x$ adhesion ability of the lean $NO_x$ catalyst 9A can be suppressed, and the performance of the lean $NO_x$ catalyst 9A can be further enhanced.

Additionally, since CO can be reliably supplied to the lean $NO_x$ catalyst 9A without causing torque fluctuation to occur, the reaction of resorbing $NO_x$ adhered to the lean $NO_x$ catalyst 9A is promoted, whereby the lean $NO_x$ catalyst 9A can be reliably regenerated. With this, there is an advantage that the performance of the lean $NO_x$ catalyst 9A can be enhanced. Also, by varying the injection time of the additional fuel injection, the concentrations of HC and CO in exhaust gases can be varied according to the quantity of $NO_x$ which is estimated to have adhered to the lean $NO_x$ catalyst 9A, so there is an advantage that appropriate concentrations of HC and CO can be supplied with respect to the quantity of $NO_x$ adhered to the lean $NO_x$ catalyst 9A.

In other words, in the case where there is a large quantity of $NO_x$ which is estimated to have adhered to the lean $NO_x$ catalyst 9A, the injection period of the additional fuel injection on the expansion stroke is made as late as possible, thereby degrading atomization of fuel. With this, oxidization of fuel is suppressed and high concentrations of HC and CO are generated.

Thus, since the concentrations of HC and CO in exhaust gases can be varied, there is an advantage that $NO_x$ adhering to the lean $NO_x$ catalyst 9A can be efficiently desorbed according to the quantity of $NO_x$ which is estimated to have adhered to the lean $NO_x$ catalyst 9A.

In addition, since additional fuel injection has been performed during the expansion stroke, a fluctuation in the output torque of the engine is reduced. Particularly, by performing the additional fuel injection in the second half of the expansion stroke, with this additional fuel injection there is also an advantage that there is almost no occurrence of torque fluctuation.

For this reason, the injection quantity of additional fuel injection can be set according to the quantities of HC and CO which are desired to be supplied to the lean $NO_x$ catalyst 9A, and much HC and CO can be supplied to the lean $NO_x$ catalyst 9A during 1 cycle, so $NO_x$ can be reliably desorbed from the lean $NO_x$ catalyst 9A.

In addition, since additional fuel injection can be performed if the air-fuel ratio of main combustion is lean, there is an advantage that the desorption of $NO_x$ or $SO_x$ from the lean $NO_x$ catalyst 9A can be performed in a wide operating state (e.g., during normal operation).

In the exhaust purifying apparatus of the embodiment of the present invention, although the adhesion quantity of a sulfur component to an $NO_x$ catalyst is estimated by surface component adhesion quantity estimation means, sulfur desorption means, for example, may be periodically operated during a specific operation without providing this estimation means specially.

In addition, in the embodiment of the present invention, while additional fuel injection is performed during the middle period of the expansion stroke or thereafter, the present invention is not limited to this. If additional fuel can be reliably burned suppressing torque fluctuation, the additional fuel injection may be performed during another period of the expansion stroke or the exhaust stroke.

Particularly, in the case where the temperature of cooling water is low, even if additional fuel injection were performed during the middle period of the expansion stroke or thereafter, the occurrence of self-ignition will be difficult. Therefore, in this case, additional fuel injection may be performed within the remaining flame period of main combustion in the first half of the expansion stroke (e.g., near a crank angle 35° to 50° after top dead point of piston compression). If done in this way, even in the case where the temperature of cooling water is low, additional fuel can be reliably burned (after-burning).

Also, the exhaust purifying apparatus of this embodiment is constituted so that it is equipped with the $NO_x$ adhesion quantity estimation means 103 and the $SO_x$ adhesion quantity estimation means 109 to perform the control of desorbing $NO_x$ from the lean $NO_x$ catalyst 9A and also perform the control of desorbing $SO_x$ from the lean $NO_x$ catalyst 9A. But, the present invention may be constituted so that it is equipped with the $SO_x$ adhesion quantity estimation means 109 alone to perform only the control of desorbing $SO_x$ from the lean $NO_x$ catalyst 9A.

In addition, in the exhaust purifying apparatus of this embodiment, when $SO_x$ is desorbed from the lean $NO_x$ catalyst 9A, an exhaust target air-fuel ratio is set so that it reaches the order of about 14, in order to make exhaust gas temperature high and promote the resolution reaction of a nitride. But, if the exhaust target air-fuel ratio is set to the order of about 11, it will be possible to make exhaust gas temperature even higher and make even higher the concentrations of HC and CO which are supplied. At the same time the desorption of $SO_x$ from the lean $NO_x$ catalyst 9A can be further promoted, the desorption of $NO_x$ from the lean $NO_x$ catalyst 9A can be also promoted and also $SO_x$ and $NO_x$ after desorption can be deoxidized.

Additionally, in the exhaust purifying apparatus of this embodiment, although the lean $NO_x$ catalyst 9A carries platinum Pt and barium Ba on a carrier, the present invention is not limited to this, but it may carry other precious metals and metals on a carrier.

Also, in the exhaust purifying apparatus of this embodiment, the start and end of additional fuel injection are controlled by whether or not the additional fuel injection on the expansion stroke has continued for a predetermined period. However, for example, the start and end of additional fuel injection may be controlled by detecting exhaust gas temperature with a temperature sensor and by whether or not this exhaust gas temperature has continued in a state of 550° C. or more for a predetermined period. With this, a degradation in fuel consumption can be prevented.

Furthermore, in the exhaust purifying apparatus of this embodiment, while expansion stroke injection is performed in sequence in each cylinder, the present invention may be set so that expansion stroke injection is performed only in a specific cylinder of four cylinders. Also, the exhaust purifying apparatus of this embodiment may be set so that expansion stroke injection is performed every predetermined cycle (e.g., once every two cycles).

Also, although the exhaust purifying apparatus of this embodiment is equipped in a spark-ignition type in-cylinder injection engine, the present invention is not limited to this. For example, it may be equipped in diesel engines.
Industrial Applicability By adopting the present invention in an exhaust purifying apparatus for an in-cylinder injection type internal combustion engine, additional fuel is made to reliably burn and exhaust gas temperature can be made to rise, without providing an additional device. Therefore, it is considered that a sulfur component adhered to an $NO_x$ catalyst can be reliably desorbed and that the durability of the $NO_x$ catalyst can be enhanced.

What is claimed is:

1. An exhaust gas purifying apparatus for an in-cylinder injection type internal combustion engine, comprising:
    a fuel injection valve for injecting fuel directly into a combustion chamber at least during a compression stroke to perform a stratified-charge combustion;
    a $NO_x$ catalyst provided in an exhaust passage of the internal combustion engine, the $NO_x$ catalyst adhering $NO_x$ thereto in an excess oxygen concentration condition and desorbing the $NO_x$ in a reduced oxygen concentration condition; and
    sulfur component desorption means for desorbing sulfur component from said $NO_x$ catalyst,
    wherein said sulfur component desorption means injects additional fuel during one of a middle period of an expansion stroke and after the middle period of the expansion stroke after a main injection for said stratified-charge combustion and burns said additional fuel within said combustion chamber to raise an exhaust gas temperature at least to a predetermined temperature to desorb the sulfur component.

2. The exhaust gas purifying apparatus for the in-cylinder injection type internal combustion engine, as set forth in claim 1, further comprising:
    a sulfur component adhesion quantity estimation means for estimating an adhesion quantity of a sulfur component which adheres to said $NO_x$ catalyst and reduces an $NO_x$ adhesion ability of said $NO_x$ catalyst,
    wherein said sulfur component desorption means is operated according to an output from said sulfur component adhesion quantity estimation means.

3. The exhaust gas purifying apparatus for the in-cylinder injection type internal combustion engine, as set forth in claim 2, wherein said sulfur component adhesion quantity estimation means estimates an adhesion quantity of the sulfur component, based on a total fuel injection quantity which is obtained from an integrated value of injector drive periods of all operating modes.

4. The exhaust gas purifying apparatus for the in-cylinder injection type internal combustion engine, as set forth in claim 1, wherein an air-fuel ratio of an exhaust gas supplied to said NOx catalyst is about 11 when desorbing the sulfur component.

5. The exhaust gas purifying apparatus for the in-cylinder injection type internal combustion engine, as set forth in claim 1, wherein said sulfur component desorption means desorbs the adhered sulfur component from said $NO_x$ catalyst when an air-fuel ratio of a main combustion as a result of the main injection is at least 20.

6. The exhaust gas purifying apparatus for the in-cylinder injection type internal combustion engine, as set forth in claim 1, wherein said sulfur component desorption means desorbs the adhered sulfur component from said $NO_x$ catalyst when a temperature of the combustion engine is above a predetermined value.

7. The exhaust gas purifying apparatus for the in-cylinder injection type internal combustion engine, as set forth in claim 1, wherein said sulfur component desorption means terminates desorption of the adhered sulfur component from said $NO_x$ catalyst after a predetermined time from injection of the additional fuel.

8. The exhaust gas purifying apparatus for the in-cylinder injection type internal combustion engine, as set forth in claim 1, wherein a start time for injecting the additional fuel is set such that an exhaust temperature reaches at least about 600 degrees centigrade.

9. The exhaust gas purifying apparatus according to claim 1, further comprising:

a cooling water temperature sensor that detects a temperature of a cooling water of the engine, wherein said sulfur component desorption means injects the additional fuel during a first period where the additional fuel is ignited by a flame remaining from a combustion of the main injection for the stratified-charge combustion, the first period being a period prior to said middle period of the expansion stroke when a detected temperature is lower than a predetermined value, and injects the additional fuel during a second period after the first period where the additional fuel can be self-ignited, the second period being within one of the middle period of the expansion stroke and after the middle period of the expansion stroke, when the detected temperature is higher than the predetermined value.

10. The exhaust gas purifying apparatus according to claim 1, wherein said sulfur component desorption means sets an air to fuel ratio of the total amount of fuel, injected during the main injection and injected as the additional fuel, to be richer than a stoichiometric ratio.

11. The exhaust gas purifying apparatus according to claim 1, wherein said sulfur component desorption means sets an air to fuel ratio of the total amount of fuel, injected during the main injection and injected as the additional fuel, to be richer than a stoichiometric ratio such that the additional fuel is re-combusted inside the combustion chamber to raise the exhaust gas temperature and to provide said $NO_x$ catalyst with unburned properties of the additional fuel as a reducing agent containing CO gas to enhance desorption of sulfur component from the $NO_x$ catalyst.

12. The exhaust gas purifying apparatus according to claim 1, wherein said engine includes a plurality of cylinders, and wherein said sulfur component desorption means injects the additional fuel only in a predetermined cylinder.

13. The exhaust gas purifying apparatus according to claim 1, wherein said sulfur component desorption means injects the additional fuel once every predetermined cycle.

14. An exhaust gas purifying apparatus for an in-cylinder injection type internal combustion engine, comprising:

a fuel injection valve for injecting fuel directly into a combustion chamber to perform a stratified-charge combustion;

a $NO_x$ catalyst provided in an exhaust passage of the internal combustion engine, the $NO_x$ catalyst adhering $NO_x$ thereto in an excess oxygen concentration condition and desorbing the $NO_x$ in a reduced oxygen concentration condition; and sulfur component desorption means for desorbing sulfur component from said $NO_x$ catalyst, wherein said sulfur component desorption means injects additional fuel during a period after a flame remaining period where the additional fuel is self-ignited, the period being within an expansion stroke after a main injection for said stratified-charge combustion, and burns said additional fuel within said combustion chamber to raise an exhaust gas temperature above a predetermined temperature to desorb the sulfur component.

* * * * *